(12) United States Patent
Abe et al.

(10) Patent No.: US 11,794,681 B2
(45) Date of Patent: Oct. 24, 2023

(54) DRIVER SEAT AIRBAG DEVICE

(71) Applicant: Autoliv Development AB, Vargarda (SE)

(72) Inventors: Kazuhiro Abe, Kanagawa (JP); Kazuki Morita, Kanagawa (JP); Hiroyoshi Shimono, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/753,763

(22) PCT Filed: Aug. 3, 2020

(86) PCT No.: PCT/JP2020/029689
§ 371 (c)(1),
(2) Date: Mar. 14, 2022

(87) PCT Pub. No.: WO2021/053982
PCT Pub. Date: Mar. 25, 2021

(65) Prior Publication Data
US 2022/0379832 A1 Dec. 1, 2022

(30) Foreign Application Priority Data
Sep. 17, 2019 (JP) ................................. 2019-168778

(51) Int. Cl.
*B60R 21/203* (2006.01)
*B60R 21/2165* (2011.01)

(52) U.S. Cl.
CPC ........ *B60R 21/203* (2013.01); *B60R 21/2165* (2013.01)

(58) Field of Classification Search
CPC .............. B60R 21/203; B60R 21/2165; B60R 21/21656; B60R 21/23332; B60R 21/23324; B60R 21/2346
See application file for complete search history.

(56) References Cited

U.S. PATENT DOCUMENTS 5,730,460 A * 3/1998 Niederman ....... B60R 21/21656
280/731
6,168,189 B1 * 1/2001 Dennis ................ B60R 21/2165
280/731

(Continued)

FOREIGN PATENT DOCUMENTS

| JP | 09-202243 A | 8/1997 |
| JP | 11-342819 A | 12/1999 |

(Continued)

*Primary Examiner* — Drew J Brown
*Assistant Examiner* — Tiffany L Webb
(74) *Attorney, Agent, or Firm* — Foley & Lardner LLP

(57) ABSTRACT

A driver seat airbag device, provided with a steering wheel and an airbag module. The steering wheel includes a variant rim with a central upper part thereof omitted, and a cover member that covers the module installation surface at the center of the rim and the airbag module. The cover member includes a frontal region on an occupant side of the airbag module, an upper region on the upper side of the airbag module, and a tear line that enables the frontal region and the upper region to open up as cover doors. The tear line extends continuously from at least the center of the frontal region to at least the center of the upper region. The cover doors open to the left and right respectively from near the center of the frontal region and upper region.

16 Claims, 12 Drawing Sheets

(56) References Cited

U.S. PATENT DOCUMENTS

| | | | |
|---|---|---|---|
| 7,004,497 B2* | 2/2006 | Thomas | B60R 21/21656 280/731 |
| 7,390,013 B2* | 6/2008 | Chavez | B60R 21/21656 280/731 |
| 7,533,899 B2* | 5/2009 | Sauer | B60R 21/2165 280/728.3 |
| 7,669,890 B2* | 3/2010 | Bito | B60R 21/203 280/731 |
| 7,766,381 B2* | 8/2010 | Fujimori | B60R 21/21656 280/731 |
| 7,845,681 B2* | 12/2010 | Abe | B60R 21/239 280/736 |
| 8,079,615 B2* | 12/2011 | Tanaka | B62D 1/04 280/743.2 |
| 9,027,955 B2* | 5/2015 | Muramatsu | B60R 21/215 280/728.2 |
| 9,321,420 B2* | 4/2016 | Kwon | B60R 21/21656 |
| 9,333,937 B1* | 5/2016 | Hock | B60R 21/21656 |
| 9,694,780 B1* | 7/2017 | Lowe | B60R 21/21656 |
| 10,144,384 B2* | 12/2018 | Ooka | B60R 21/21656 |
| 11,383,664 B2* | 7/2022 | Yamamoto | B60R 21/203 |
| 11,420,585 B2* | 8/2022 | Kwon | B60R 21/2176 |
| 2003/0151233 A1* | 8/2003 | Varcus | B60R 21/233 280/729 |
| 2005/0121889 A1 | 6/2005 | Enders | |
| 2007/0145729 A1* | 6/2007 | Ishiguro | B60R 21/239 280/739 |
| 2008/0048420 A1* | 2/2008 | Washino | B60R 21/203 280/731 |
| 2010/0201105 A1* | 8/2010 | Iwazato | B60R 21/21656 280/731 |
| 2017/0355341 A1* | 12/2017 | Keyser | B60R 21/203 |
| 2020/0307486 A1* | 10/2020 | Ishii | B60R 21/203 |
| 2022/0089114 A1* | 3/2022 | Morita | B60R 21/231 |

FOREIGN PATENT DOCUMENTS

| | | |
|---|---|---|
| JP | 2007-062469 A | 3/2007 |
| JP | 2008-30718 A | 2/2008 |
| JP | 2008-049858 A | 3/2008 |
| JP | 2008-094341 A | 4/2008 |
| JP | 2008-173994 A | 7/2008 |
| JP | 2008-201251 | 9/2008 |
| JP | 2008-201251 A | 9/2008 |
| JP | 2008-273480 | 11/2008 |
| JP | 2008-273480 A | 11/2008 |
| JP | 2008-296760 | 12/2008 |
| JP | 2008-296760 A | 12/2008 |
| JP | 2018-122798 A | 8/2018 |

* cited by examiner

FIG. 1
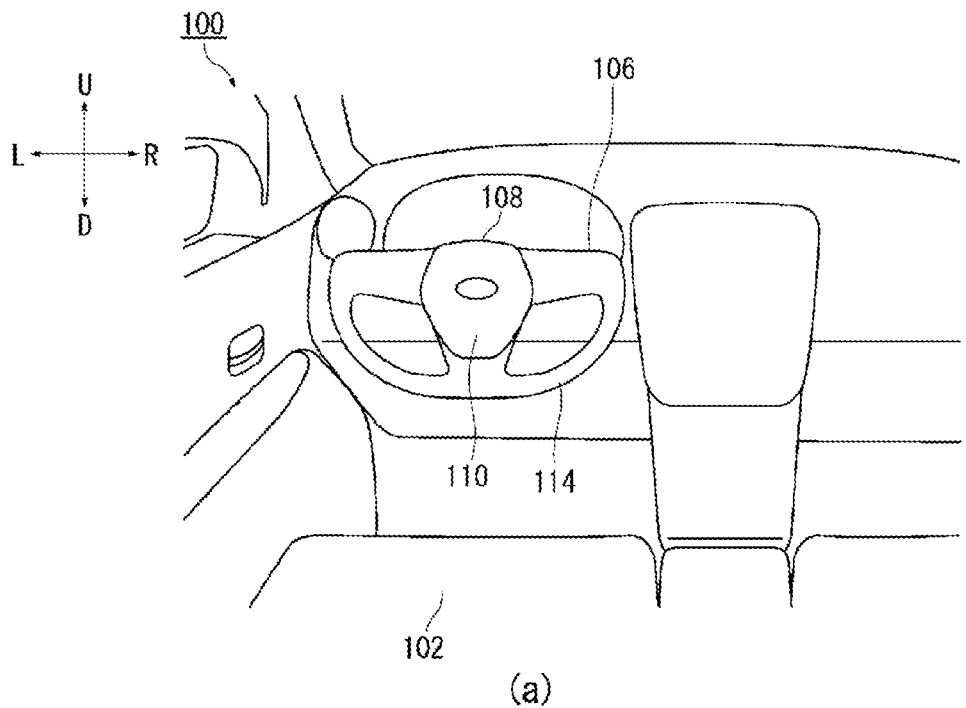
(a)
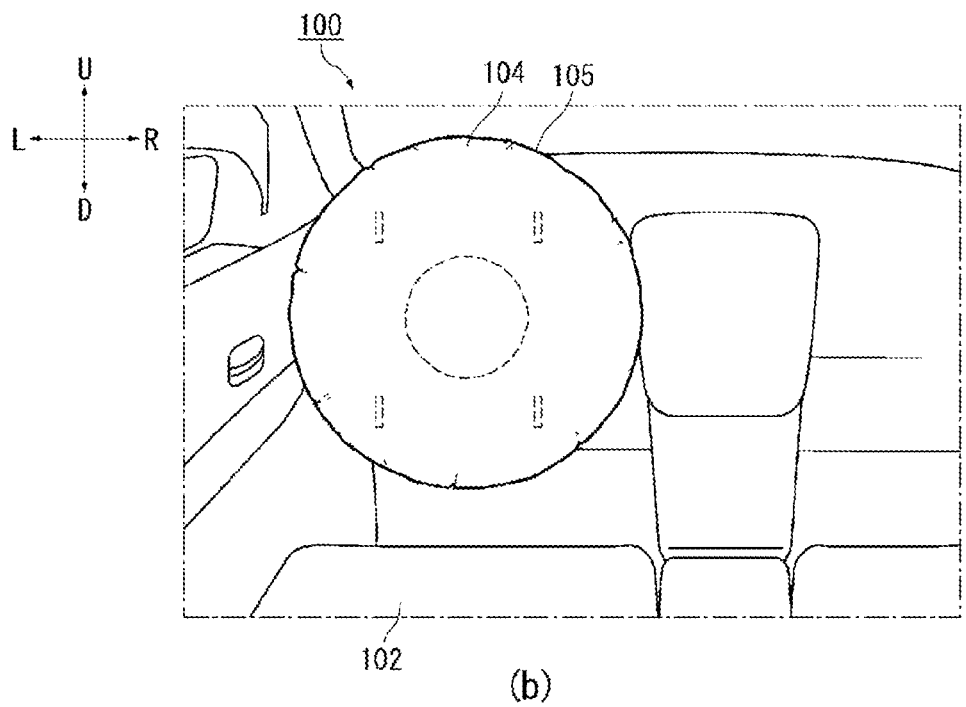
(b)

FIG. 3
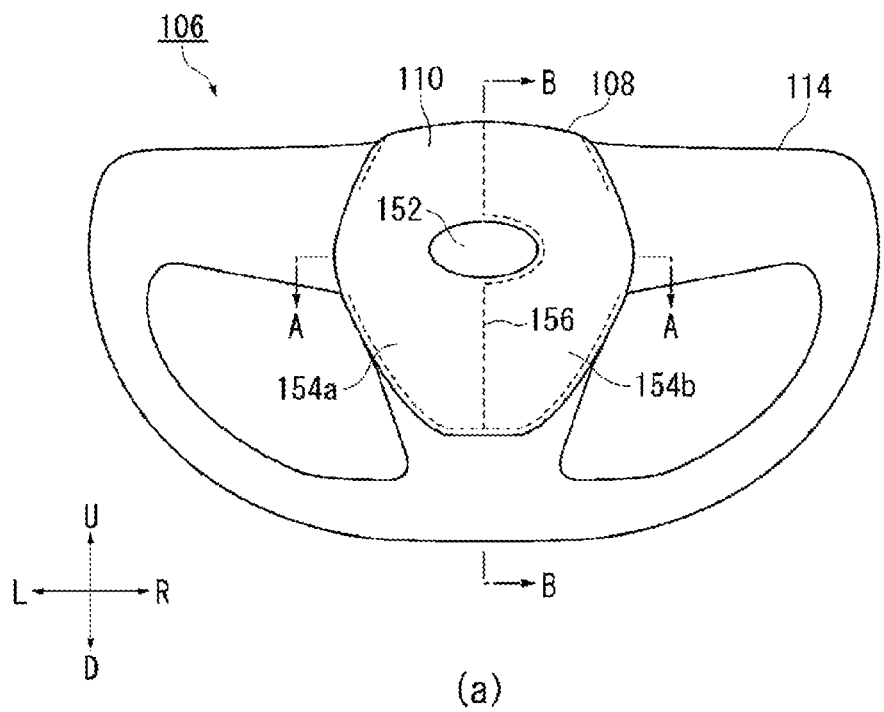
(a)
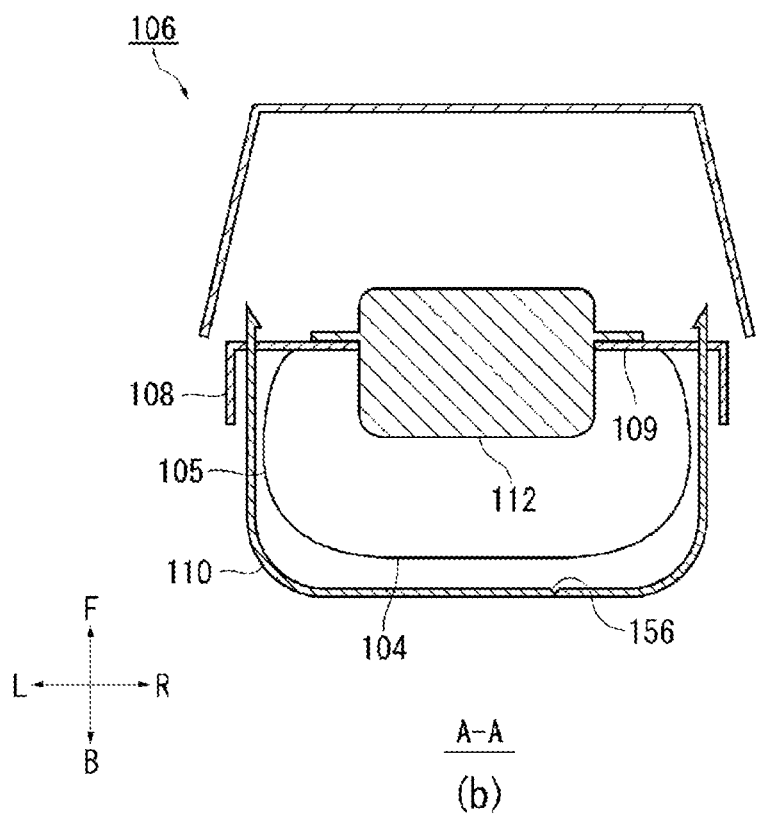
A-A
(b)

FIG. 4
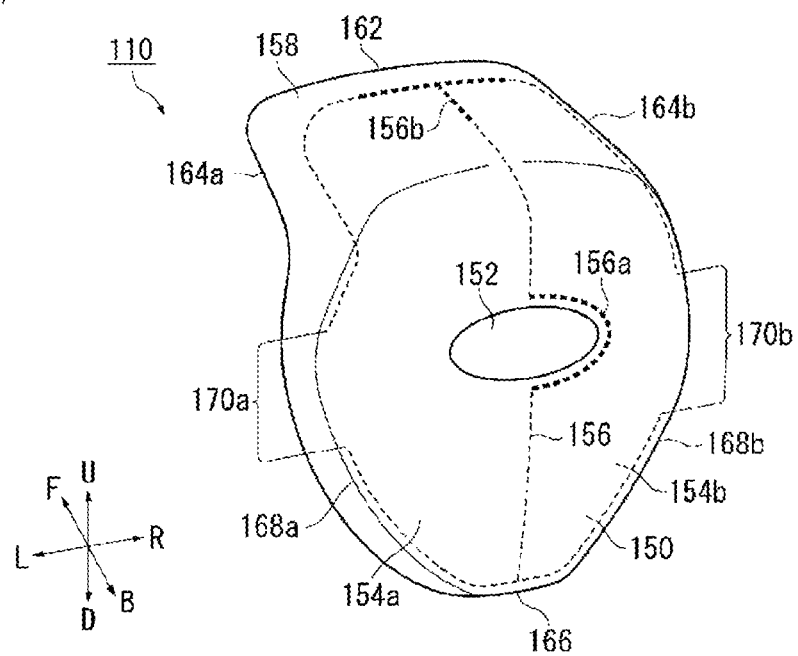
(a)
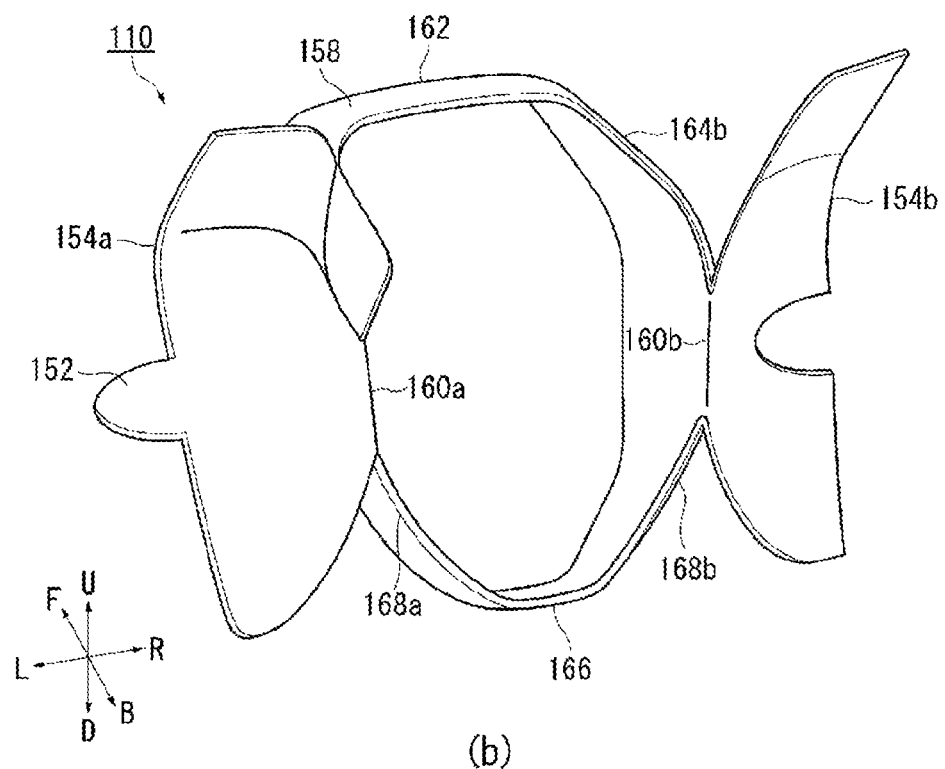
(b)

FIG. 5
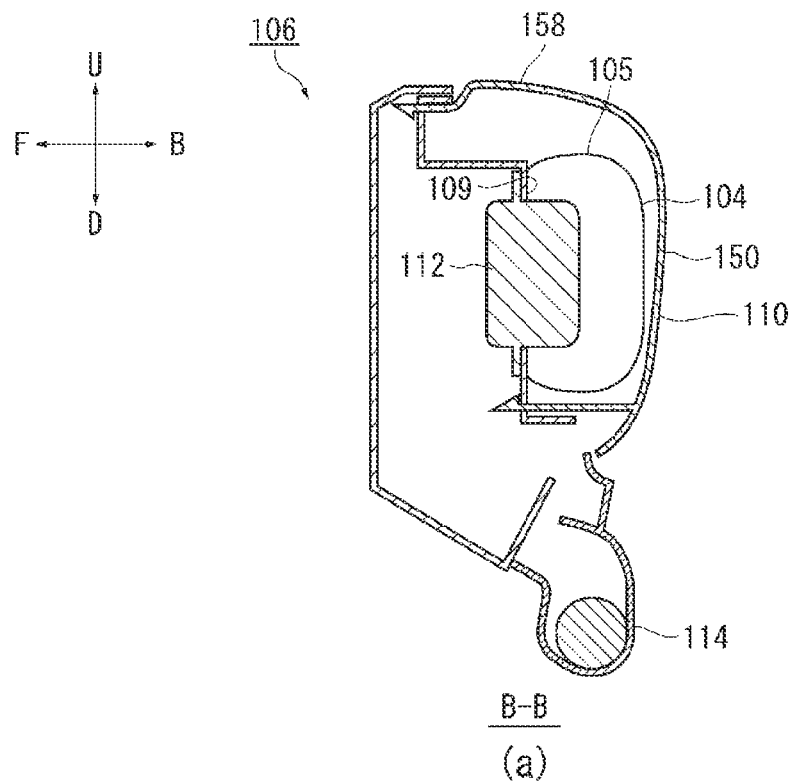
(a)
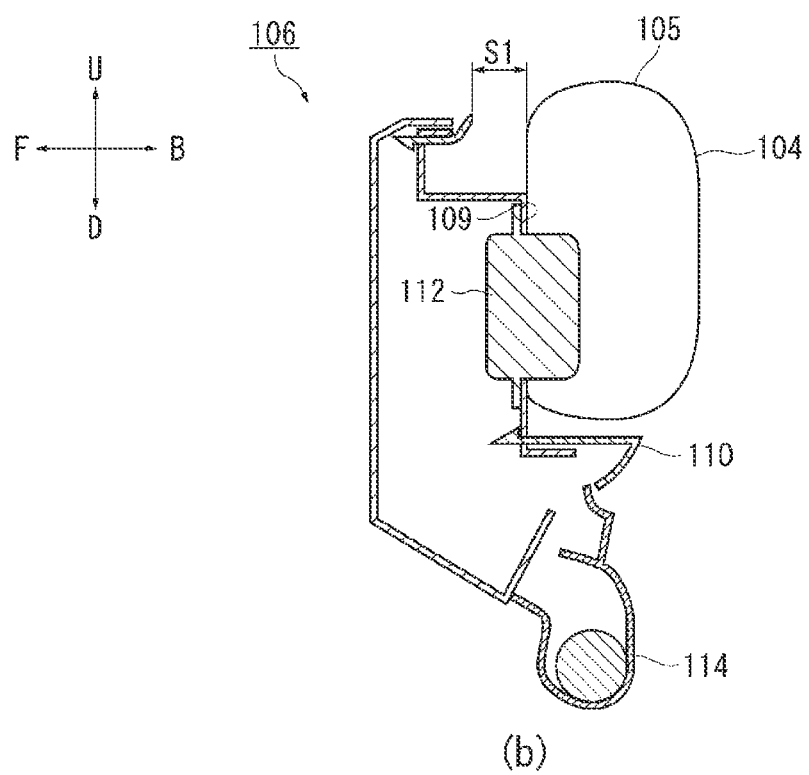
(b)

FIG. 7
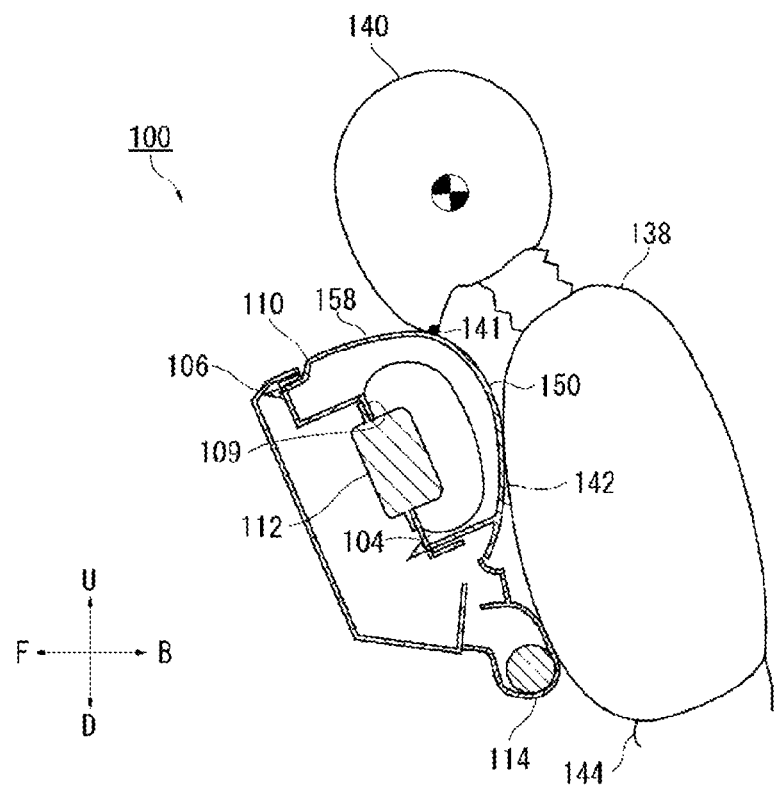
(a)
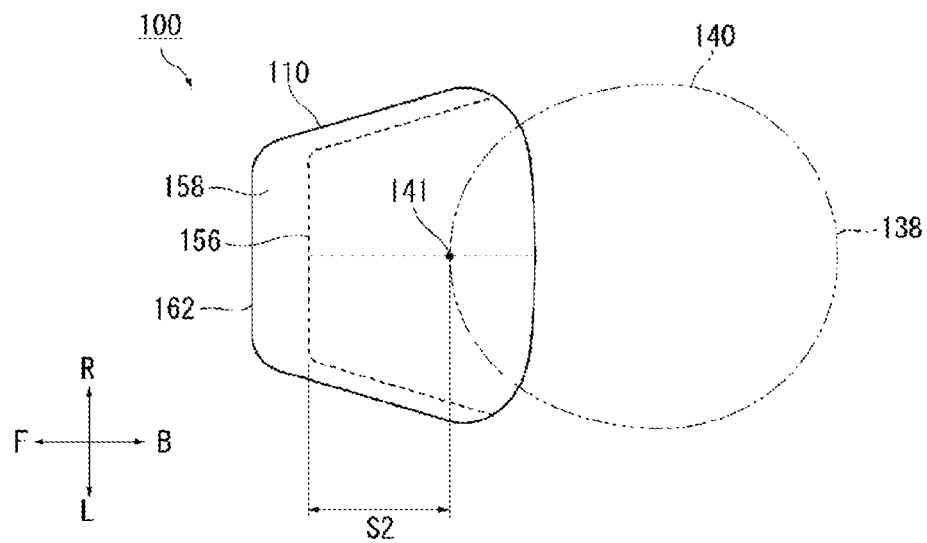
(b)

FIG. 8
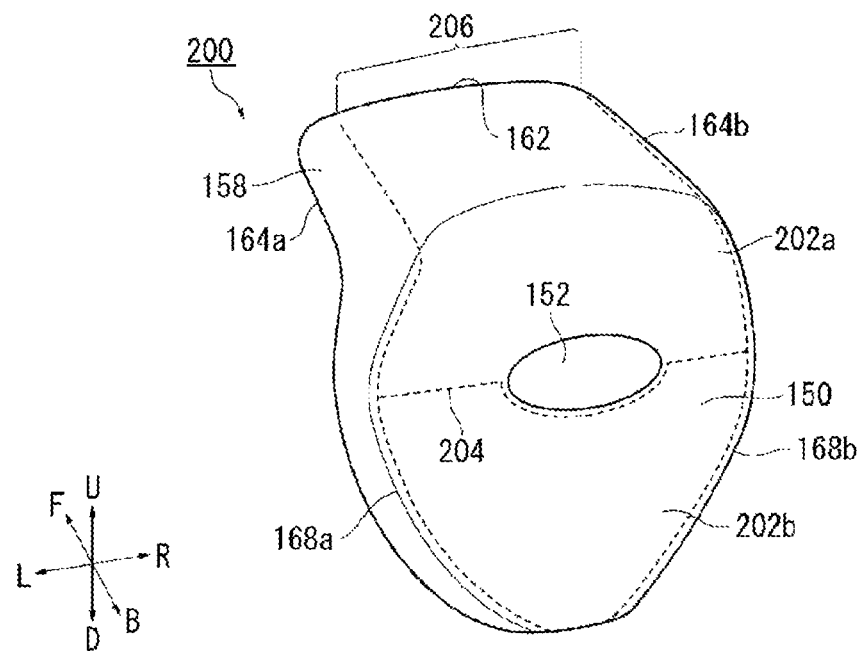
(a)
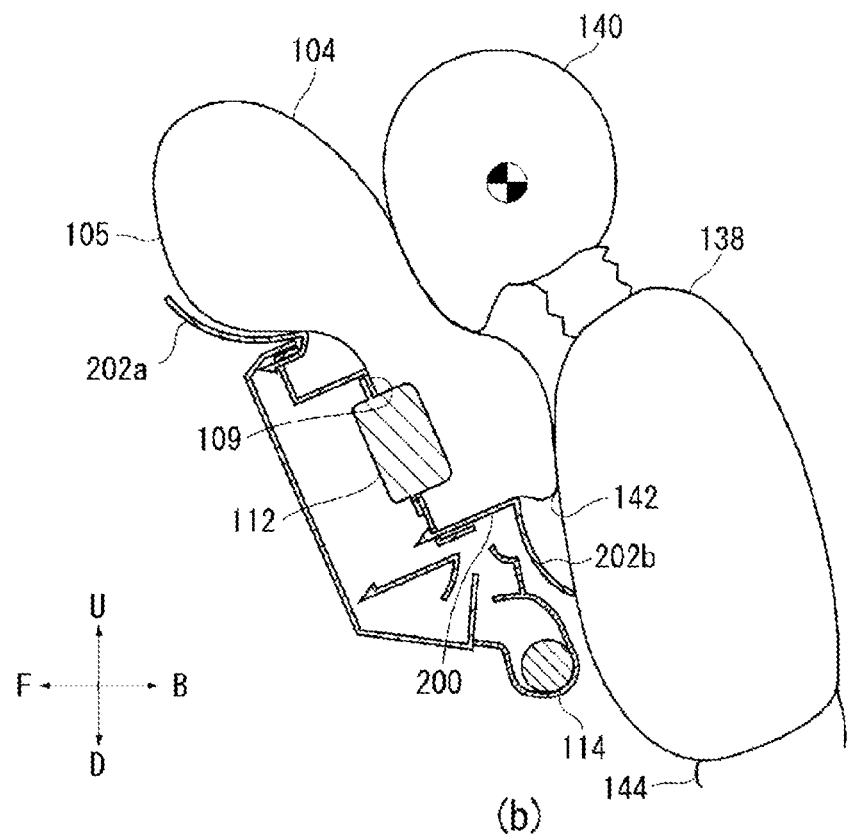
(b)

FIG. 9
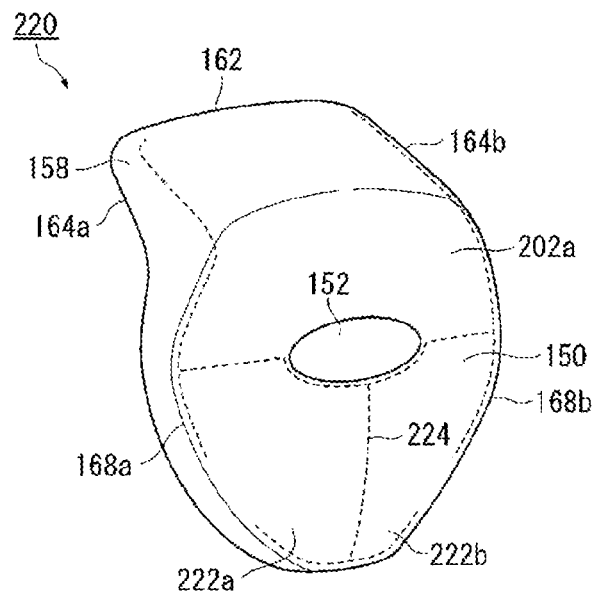
(a)
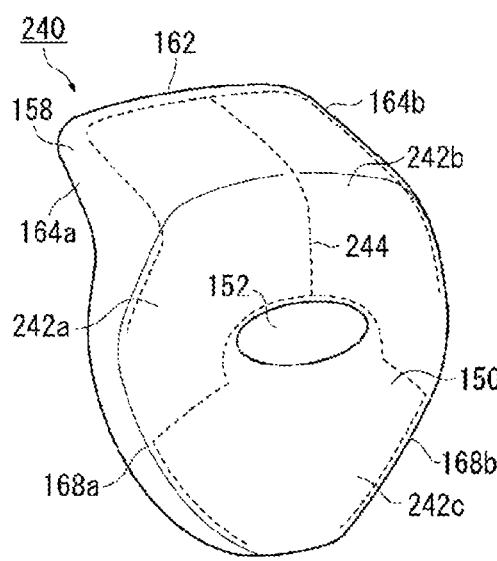
(b)
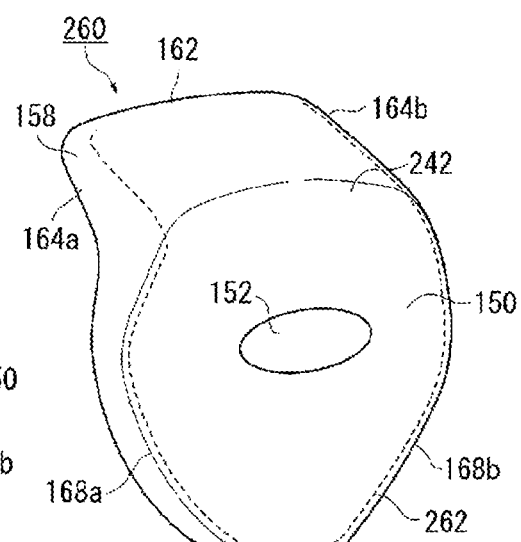
(c)

FIG. 12
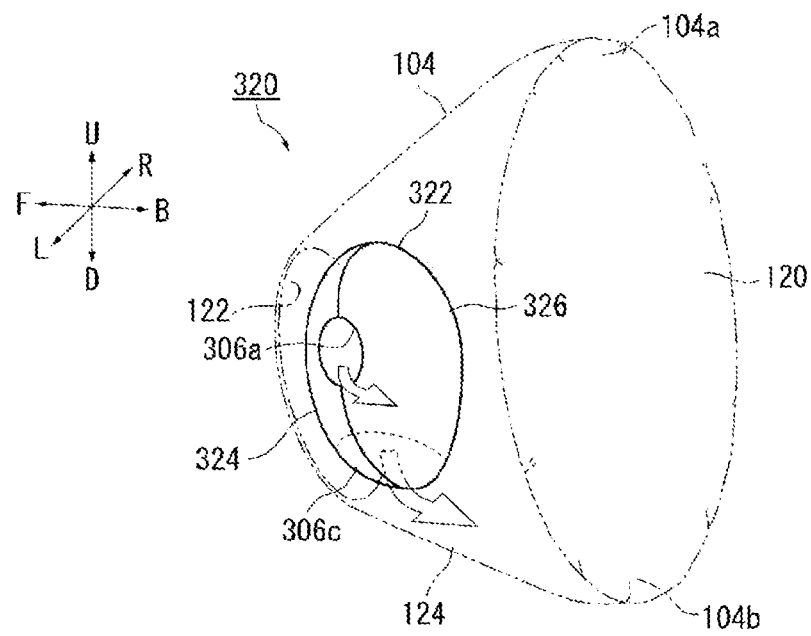
(a)
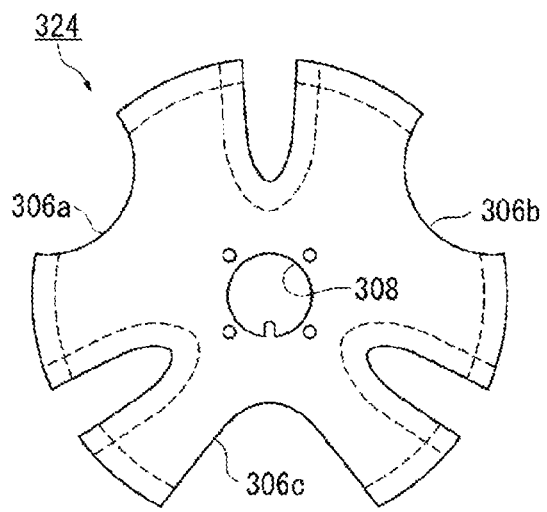
(b)
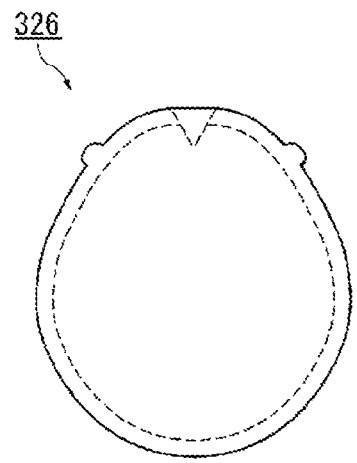
(c)

DRIVER SEAT AIRBAG DEVICE

TECHNICAL FIELD

The present invention relates to a driver's seat airbag device for restraining an occupant in an emergency.

BACKGROUND TECHNOLOGY

Currently, nearly all vehicle steering wheels are equipped with a driver seat airbag device. The airbag cushion of the driver seat airbag device is primarily stored in the central hub of the steering wheel, and expands and deploys in front of an occupant by cleaving a plastic cover member or the like by the expansion pressure thereof. For example, in the steering wheel 1 of Patent Document 1, when the airbag 22 expands and deploys, the cover body 23 is configured to open upward. In Patent Document 1, by bringing the cover body 23 into contact with the rim part 5, the airbag 22 is supported from the forward side of the vehicle by the cover body 23.

PRIOR ART DOCUMENTS

Patent Documents

Patent Document 1: Japanese Unexamined Patent Application Publication No. 2008-30718

SUMMARY OF THE INVENTION

Normally, the shape of an airbag cushion for the driver seat is determined based on the assumption that the occupant is seated in the seat in a normal posture. However, while traveling, the occupant may not always be in a constant posture, for example, they may lean forward unexpectedly. When the occupant is in a non-normal position relative to the seat sitting position (commonly known as out-of-position), the airbag cushion may contact the head of the occupant from below in the event of an emergency situation. In this case, the airbag cushion will cause the head of the occupant to retroflex backwards. Due to the structure of the human body, it is known that movements that rotate the head, such as retroflexing backwards, tend to place a burden on the body.

In addition, in recent years, a system that transmits a steering operation using an electrical signal is becoming popular. This manner of steering system is called steer-by-wire (SBW) where steering force is transmitted using a wiring harness rather than a steering shaft, and is attracting attention in terms of operability and design.

In the steer-by-wire steering system described above, rotation of greater than 180° as in conventional systems is not required so the rim can be something other than a circular shape. For example, the rim may be provided only to the left and the right of the central hub or the part above the center on a conventional circular rim, in other words, the rim part 5a in FIG. 1 of cited document 1 may be omitted. The rim with the upper center omitted is beneficial in terms of design and visibility of meter displays, but the head of the occupant moves forward more readily as well. For example, when the rim part 5a in FIG. 1 of Patent Document 1 is omitted, the head of the occupant more readily moves forward, and the cover body 23 and the airbag 22 are more likely to push the head up from below.

Problem to be Solved by the Invention

In view of these issues, an object of the present invention is to provide a driver seat airbag device that takes safety into consideration when activated.

Means for Solving the Problems

In order to resolve the problems described above, a representative configuration of a driver seat airbag device according to the present invention comprises, a steering wheel of a vehicle; and an airbag module including an inflator and an airbag cushion, the airbag module being housed in the steering wheel, wherein
the steering wheel includes:
a variant rim with upper center part thereof omitted;
a module installation surface for installing the airbag module provided in a center of the rim;
a cover member covering the airbag module installed on the module installation surface;
the cover member includes:
a frontal region covering an occupant side of the airbag module;
an upper region extending from the upper end of the frontal region toward the front of the vehicle and covering the upper side of the airbag module; and
a tear line provided in a groove shape on the airbag module side of the frontal region and upper region, which cleaves open due to expansion pressure of the airbag cushion, and causes the frontal region and upper region to open as one or a plurality of cover doors;
the tear line extends continuously from at least the center of the frontal region to at least the center of the upper region, and
the one or a plurality of cover doors includes at least two cover doors that open respectively from the center regions of the frontal region and upper region to the left and right.

With the configuration described above, even if the head of the occupant is positioned above the cover member, the cover doors open to the left and right so upward thrust of the head of the occupant by the cover doors can be prevented. Additionally, since the cover member also opens up to the upper region in addition to the frontal region, if the head of the occupant is positioned above the cover member, expansion pressure of the airbag cushion can more readily be dispersed toward the front of the vehicle. Herein, with the configuration described above reducing and dispersing force causing upward thrust on the head of the occupant suppresses backward retroflexion of the head and improves safety of the occupant.

The tear lines described above branch from near the center of the upper region to the left and right along the front edge of the upper region, extend towards the sides of the upper region, extend at each of the sides of the upper region towards the frontal region respectively, reaching the frontal region, and then respectively extending along the sides of the frontal region, parts of the tear lines are omitted along the sides of the frontal region respectively that do not cleave, forming a pair of side hinge regions that are hinges for the two cover doors. This configuration enables implementing cover doors that open to the left and right and widely opening the upper region of the cover member.

The pair of side hinge regions are formed such that the respective axes thereof are parallel when viewed directly facing the frontal region. This configuration suitably enables implementing cover doors that open to the left and right.

The tear line described above may extend from near the center of the frontal region to the bottom end of the frontal region, branching from the bottom towards each of the sides of the frontal region, and up to the pair of side hinge regions. This configuration also suitably enables implementing cover doors that open to the left and right.

In order to resolve the problems described above, a representative configuration of a driver seat airbag device according to the present invention includes,
a steering wheel of a vehicle;
and an airbag module including an inflator and an airbag cushion, the airbag module being housed in the steering wheel, wherein
the steering wheel includes:
a variant rim with upper center part omitted;
a module installation surface for installing the airbag module provided near a center of the rim;
a cover member covering the airbag module installed on the module installation surface; and,
the cover member includes:
a frontal region covering an occupant side of the airbag module;
an upper region extending from the upper end of the frontal region toward the front of the vehicle and covering the upper side of the airbag module; and
a tear line provided in a groove shape on the airbag module side of the frontal region and upper region, which cleaves open due to expansion pressure of the airbag cushion, and causes the frontal region and upper region to open as one or a plurality of cover doors;
the tear line extends at least across the frontal region to each side of the frontal region, extends along the sides to a point near the sides of the upper region, and from there, extending from each point near the sides of the upper region along the sides of the upper region to a point on both sides of the upper region more forward than the module installation surface, and
the one or more cover doors include at least one cover door that opens upwards.

With the configuration described above, even with cover doors that open upwards, by opening up to a point more towards the front of the vehicle than the module installation surface, upward thrust on the head of the occupant by the cover door can be prevented. In addition, widely opening the upper region of the cover member enables dispersing the airbag cushion expansion pressure towards the front of the vehicle. Herein, with the configuration described above reducing and dispersing force causing upward thrust on the head of the occupant suppresses backward retroflexion of the head and improves safety of the occupant.

Omitting the tear line at a prescribed region more toward the front of the vehicle than the module installation surface in the upper region forms a front hinge region as a hinge that does not cleave for the one cover door. This configuration also enables causing the upper region of the cover member to open widely.

The one or more cover doors of the upper region are formed over 35 mm or more towards the front of the vehicle from the chin of an occupant, who is in contact with the steering wheel and in a state where motion toward the front of the vehicle has culminated. Causing the upper region of the cover member to open along these dimensions efficiently suppresses upward thrust of the airbag cushion on the head of the occupant.

The one or more cover doors described above are preferably formed to include a range in the upper region from the frontal region up to a point more forward in the vehicle than the module installation surface. This configuration also enables causing the upper region of the cover member to open widely.

A part of the tear line provided in the frontal region described above is preferably thinner than the tear line provided in the upper region. With this configuration, the cover member normally first cleaves from the frontal region while if the frontal region does not readily open, for example, if in contact with an occupant, cleaving starts from the upper region enabling dispersing expansion pressure of the airbag cushion toward the front of the vehicle.

The airbag cushion described above includes:
a main bag in a bag shape; and
a flow-regulating material encapsulated in this main bag that covers portions including gas outlet ports of the inflator;
the flow-regulating material comprises:
one or a plurality of discharge ports for discharging gas supplied by the inflator, and
the one or a plurality of discharge ports discharge gas diagonally upward to the left and right when viewing the frontal region directly from the front. This configuration of the flow-regulating material enables efficient application of gas so that with respect to the cover member, the cover doors open to the left and right.

The one or more discharge ports described above are preferably formed on a path connecting the inflator and tear line. The flow-regulating material of this configuration enables efficient cleaving of the cover member tear line.

The one or more discharge ports described above can discharge gas diagonally from the side opposite the frontal region. This configuration enables dispersing expansion pressure of the airbag cushion toward the front of the vehicle.

Effect of the Invention

According to the present invention, a driver seat airbag device that takes safety into consideration when activated can be provided.

BRIEF DESCRIPTION OF THE DRAWINGS

FIG. 1 is a diagram illustrating an overview of a driver's seat airbag device in accordance with an embodiment of the present invention.

FIG. 3 is a diagram illustrating the steering wheel in FIG. 1(a) from various directions.

FIG. 4 is a perspective view illustrating the cover member of FIG. 3(a) by itself.

FIG. 5 is a cross sectional view taken along B-B of the steering wheel of FIG. 3(a).

FIG. 7 is a diagram illustrating an example of an occupant in proximity to the steering wheel in FIG. 5(a).

FIG. 8 is a diagram illustrating a first modified example of the cover member in FIG. 4(a).

FIG. 9 is a diagram illustrating the second to fourth modified examples of the cover member in FIG. 4(a).

FIG. 12 is a diagram illustrating a second modified example of the airbag module in FIG. 2(a).

MODE FOR CARRYING OUT THE INVENTION

Figure 2:
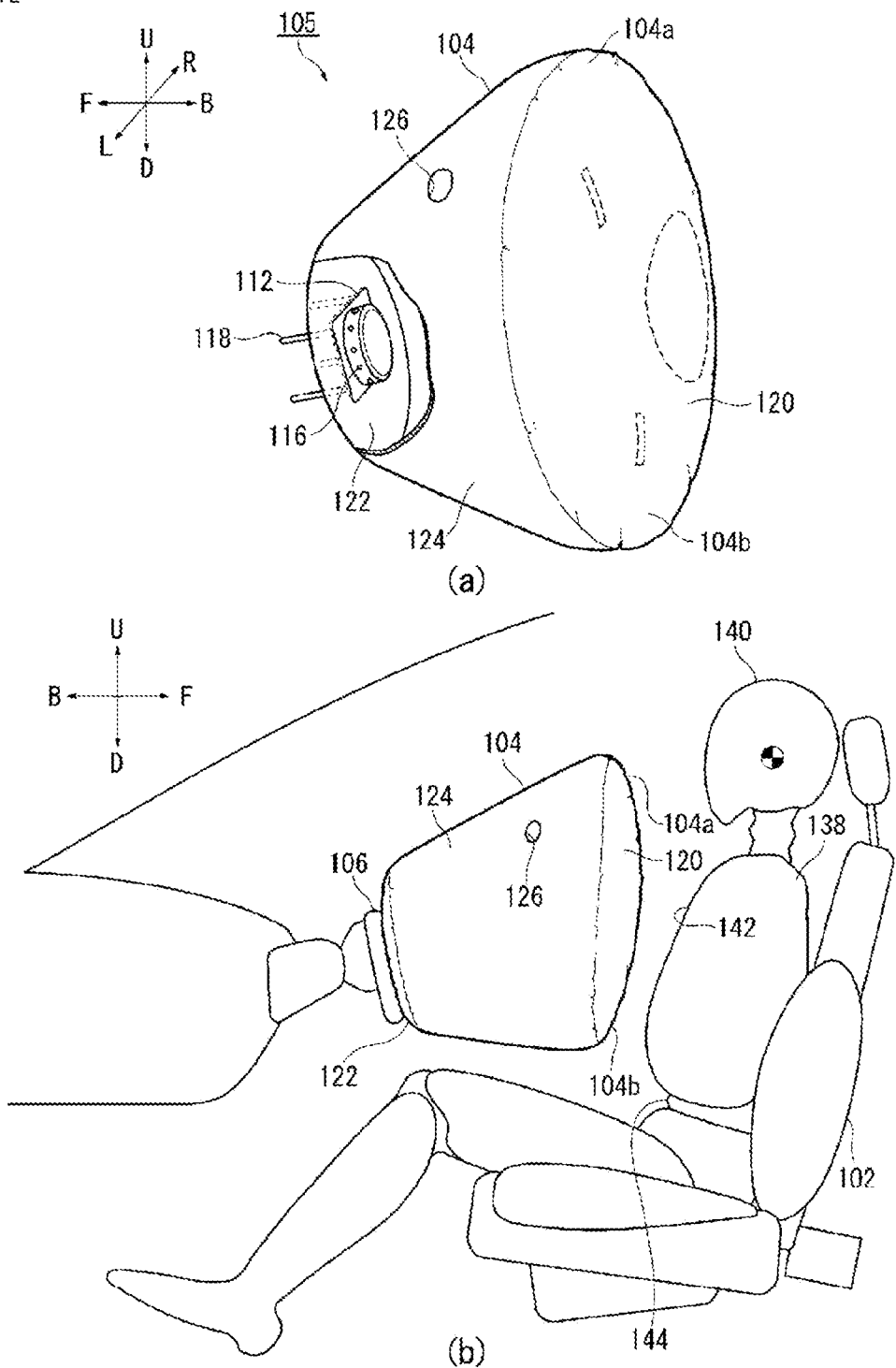
FIG. 2 is a diagram illustrating the airbag module in FIG. 1(b) in an activated state from various directions.

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

FIG. 1 is a diagram illustrating an overview of a driver seat airbag device (hereinafter referred to as airbag device 100) according to an embodiment of the present invention. FIG. 1(a) is a diagram illustrating a state before activation of the airbag device 100. Hereinafter, regarding FIG. 1 and other diagrams, a vehicle front-rear direction is illustrated by the symbols F (Front) and B (Back), a vehicle width direction of the vehicle by the symbols L (Left) and R (Right), and a vehicle up-down direction by the symbols U (Up) and D (Down).

The airbag device 100 is applied in the present embodiment as the airbag for the driver's seat for vehicles with a steering wheel on a left side (front row left side seat 102). Hereinafter, descriptions are made assuming the front row left side seat 102, for example, a vehicle outer side in the vehicle width direction (hereinafter, vehicle outer side) refers to a left side of the vehicle, and an inner side in the vehicle width direction (hereinafter, vehicle inner side) refers to a right side of the vehicle.

The airbag cushion (hereinafter, referred to as cushion 104 (see FIG. 1(b)) of the airbag device 100 is stored in a folded or rolled condition or the like in front of a seating position of the seat 102, inside a central hub 108 of a steering wheel 106. At this time, the cushion 104 is stowed together with an inflator 112 (see FIG. 2(a)) that supplies gas; forming an airbag module 105 (see FIG. 2(a)).

The steering wheel 106 is assumed to be of a configuration in which occupant operation is converted into an electrical signal and transmitted to the wheels, and the shape of a rim 114 gripped by the occupant is a different shape as compared to a conventional circular shape. As a result, the rim 114 has a shape of only being provided on the left, right and below the central hub 108 while the central upper part above the hub 108 is omitted.

FIG. 1(b) is a diagram illustrating a vehicle after activation of the driver seat airbag device 100. The cushion 104 begins to expand based on gas from the inflator 112 (see FIG. 2(a)), opening a cover member 110 of the hub 108 (see FIG. 1(a)). The cushion 104 expands and deploys at the front of the seat 102 sitting position and restrains the upper torso, head, and chest of the occupant attempting to move forward from the seating position. The cushion 104 has a circular shape as viewed from the seating position side, and is formed by overlaying a plurality of panels that form the surface thereof and then stitching or adhering.

FIG. 2 is a diagram illustrating the after activated airbag module 105 in FIG. 1(b) from various directions. FIG. 2(a) illustrates the airbag module 105 of FIG. 1(b) viewed from slightly above the exterior of the vehicle. In FIG. 2(a), a portion of the panel configuring the cushion 104 is cut out to expose the internal inflator 112.

The cushion 104 has a shape similar to a truncated cone, with the diameter widening from the steering wheel 106 side (see FIG. 1(a)) toward the occupant side (vehicle rear side). The cushion 104 is formed from a plurality of panels and contains a front panel 120 positioned on the occupant side, a rear panel 122 positioned on the steering wheel 106 side (see FIG. 1(a)), and a side panel 124 connecting the front panel 120 and the rear panel 122 to form a side portion of the cushion 104. The side panels 124 are also provided with vent holes 126a for discharging gas.

The inflator 112 is a device for supplying gas, and in the present embodiment, a disk type is used. Regarding the inflator 112, a portion thereof formed with a gas outlet port 116 inserted into the cushion 104 through a rear panel 122, is activated based on an impact detection signal transmitted from a sensor (not shown) to supply gas to the cushion 104. The inflator 112 is provided with a plurality of stud bolts 118. The stud bolts 118 pass through a rear panel 122 of the cushion 104 to fasten to the module installation surface 109 inside of the hub 108 of the steering wheel 106 (see FIG. 4(a)). The cushion 104 is also secured to the steering wheel 106 by fastening of the stud bolts 118 to the module installation surface 109.

Note that examples of currently prevailing inflators include: types filled with a gas generating agent and that burns the agent to generate a gas; types filled with a compressed gas and supplies the gas without generating heat; hybrid types that utilize both a combustion gas and a compressed gas; and the like. Any of these types of inflators can be used as the inflator 112.

FIG. 2 illustrates an occupant 138 normally seated in the cushion 104 and seat 102 as viewed from the left side in the vehicle width direction. The cushion 104 can restrain the occupant 138 from the head 140 to chest 142, and to the abdomen 144 thereof, with the occupant side front panel 120 as the primary restraining surface. In an emergency, the occupant 138 attempting to move forward in the vehicle will make contact at an early stage from the upper portion 104a of the cushion 104. The width of the upper portion 104a of the expanded and deployed cushion 104 is thicker than the width of the lower part 104b of the cushion 104, enabling suitably absorbing the load from the head 140 of the occupant 138. With the cushion 104 of the present example, the width in the front-rear direction of the vehicle decreases toward the lower part 104b, and therefore, the lower part 104b readily enters the narrow space between the steering wheel 106 and the abdomen 144.

FIG. 3 is a diagram illustrating the steering wheel 106 in FIG. 1(a) from various directions. FIG. 3(a) is an enlarged view of the steering wheel 106 in FIG. 1(a). A cover member 110 made of resin is attached to the central hub 108 of the steering wheel 106. The frontal region 150 on the occupant side of the cover member 110 is a region formed as a flat surface or a curved surface that widens on the front face of the cover member 110 in the field of view as viewed from the passenger seated normally in the seat 102 (see FIG. 2(b)), with an emblem 152 or the like applied thereon.

In the following description, the upper and lower and left-right direction directions of the cover member 110 refer to the upper and lower left and right directions of the steering wheel 106 in the neutral position. Specifically, the vertical direction of the cover member 110 is the vertical direction when the frontal region 150 is viewed from the front of the steering wheel 106 in the neutral position, and does not represent the strict vertical direction. Additionally, the left-right direction of the cover member 110 is the left-right direction when the frontal region 150 is viewed from the front of the steering wheel 106 in the neutral position. Note that the front and rear of the cover member 110 means the forward side and rearward side of the vehicle as viewed from a position above the cover member 110 and does not mean a strict horizontal line in the front-to-back direction.

The cover member 110 in the present embodiment is configured so as to cleave open during expansion and deployment of the cushion 104 (see FIG. 1(b)) and two cover doors 154a and 154b open to the left and right. The cover doors 154a and 154b are defined by a tear line 156 provided in the cover member 110.

FIG. 3(b) is a cross-sectional view along line A-A of the hub 108 of the steering wheel 106 in FIG. 3(a). The airbag module 105 is stowed inside the hub 108 located in the center of the rim 114 (see FIG. 3(a)). The airbag module 105 is installed on the module installation surface 109 inside the hub 108 and is covered by the cover member 110. The tear line 156 is provided in a groove on the side of the airbag module 105 of the cover member 110. The tear line 156 induces a cleavage in the cover member 110 when subjected to inflation pressure from the cushion 104 by reducing the plate thickness of the cover member 110.

FIG. 4 is a perspective view illustrating the cover member 110 in FIG. 3(a) by itself. FIG. 4(a) illustrates a cover member 110 prior to cleavage. The frontal region 150 of the cover member 110 covers the passenger side of the airbag module 105 (see FIG. 3(b)), and the upper region 158 covers the upper side of the airbag module 105. The tear line 156 is provided from the frontal region 150 of the cover member 110 to the upper region 158.

FIG. 4(b) is a diagram illustrating the cover member 110 after cleavage. The cover member 110 of the present embodiment is made of resin, and in a normal temperature environment (approximately 23° C., for example), the expansion pressure of the cushion 104 causes cleaving starting at the tear line 156 (see FIG. 4(a)). In the cleaved cover member 110, the two cover doors 154a and 154b open to the left and right when viewed from the proximity of the center of the frontal region 150.

Regarding the cover doors 154a and 154b, the left cover door 154b includes an emblem 152 and the frontal region 150 and upper region 158 of the cover member 110 are formed so as to be divided into the left and right. The cover member 110 is formed with hinges 160a and 160b that connect a body of the cover member 110 to the cover doors 154a and 154a such that the cover doors 154a and 154b do not go flying.

As illustrated in FIG. 4(a), the tear line 156 extends continuously from the center of the frontal region 150 to the vicinity of the center of the upper region 158 while avoiding the emblem 152. In the upper region 158, the tear line 156 extends from the central vicinity toward the front end 162 and branches to the left and right along the front end 162 to extend toward the side portions 164a and 164b of the upper surface region 158, respectively. Also, the tear line 156 extends towards the frontal region 150 of side parts 164a and 164b of the upper region 158. Upon reaching the frontal region 150, the tear line 156 extends along each of the sides 168a and 168b of the frontal region 150. Also, upon reaching the lower end 166 of the frontal region 150 below the emblem 152, the tear line 156 branches from the lower end 166 towards the respective sides 168a and 168b of the frontal region 150.

Note that in the descriptions above, vicinity of the center of the frontal region 150 indicates an area including the area center of gravity and vicinity with the frontal region 150 in a plane and viewed vertically from above and the area including the geometric center position of the frontal region 150 and the vicinity thereof. In addition, the center region of the upper region 158 means when viewing the upper region 158 as a plane perpendicularly from above, the area center of gravity thereof and nearby areas, the geometric center position of the upper region 158 and nearby areas, or simply the areas close to the centerline of the upper region 158 in left and right directions.

A part of the tear line 156 along the side parts 168a and 168b of the frontal region 150 is omitted and so cannot be broken. This non-breakable part forms a pair of side hinge regions 170a and 170b that are hinges 160a and 160b (see FIG. 4(b)) of the cover door 154a.

The pair of side hinge regions 170a and 170b are formed respectively on side parts 168a and 168b of the frontal region 150 where the tear line 156 is not present. The pair of side hinge regions 170a and 170b are formed such that the respective axes (see FIG. 4(b)) of the hinges 160a and 160b are parallel when viewed directly facing the frontal region 150. With this configuration, the cover doors 154a and 154b are able to mutually open broadly in a 180° direction relative to each other to form a wide opening.

FIG. 5 is a cross sectional view taken along line B-B of the steering wheel 106 of FIG. 3(a). FIG. 5(a) illustrates the state prior to cleaving of the cover member 110. As described above, the frontal region 150 of the cover member 110 covers the occupant side of the airbag module 105. Also, the upper region 158 extends from the upper end of the frontal region 150 toward the front of the vehicle and covers the upper side of the airbag module 105.

FIG. 5(b) illustrates the state after cleaving of the cover member 110. In this embodiment, the upper region 158 (see FIG. 5(a)) of the cover member 110 is configured with a wide opening in consideration of safety when the cushion 104 (see FIG. 6(a), and the like) expands and deploys. More specifically, compared to the module installation surface 109 where the inflator 112 of the airbag module 105 is installed and secured, an opening in the upper region 158 extends to a position beyond the module installation surface 109 by a distance S1 towards the front of the vehicle.

To achieve the configuration described above, the cover doors 154a and 154b (see FIG. 4A) are formed to include a range of the upper region 158 from the frontal region 150 side to a point more forward in the vehicle than the module installation surface 109 (see FIG. 6B). That is, the tear line 156 extends from near the center of the frontal region 150 to a point more forward on the vehicle than the module installation surface 109 near the center of the upper region 158.

Figure 6:
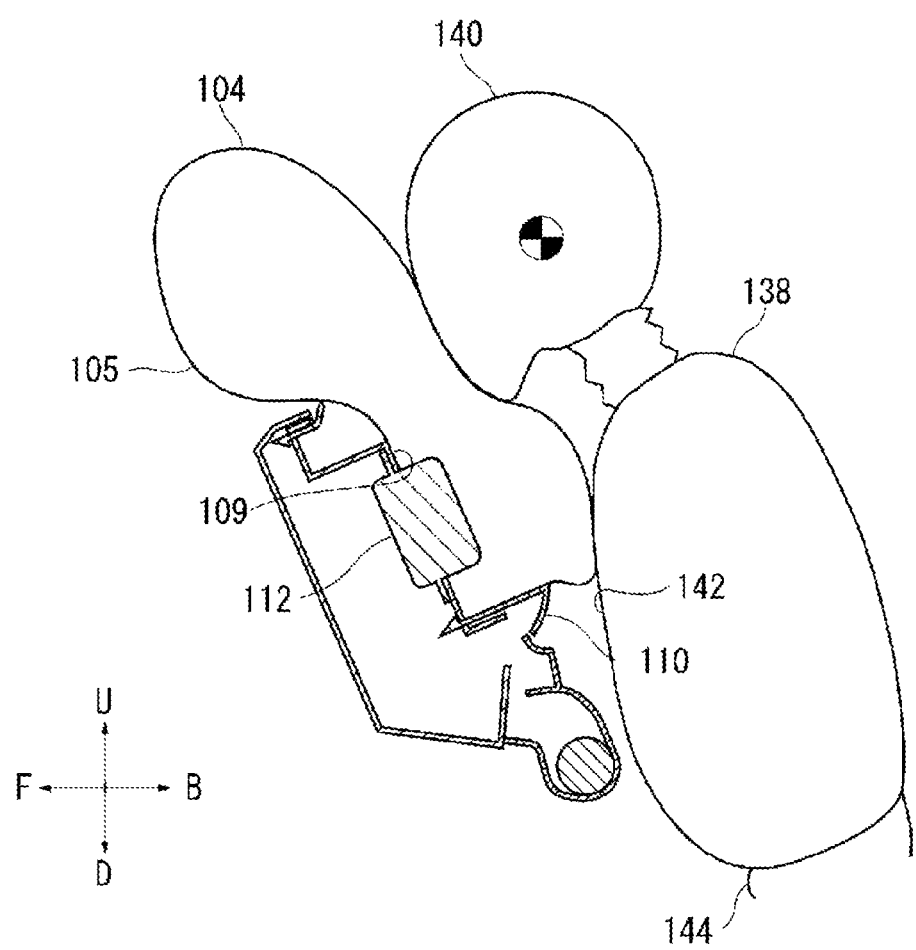
FIG. 6 is a diagram illustrating the cushion in FIG. 5(b) during expansion and deployment and an occupant in a non-normal seating position.

FIG. 6 is a diagram illustrating the occupant 138 in a non-normal seating position (normally called out-of-position) when the cushion 104 expands and deploys as in FIG. 5(b). FIG. 6 illustrates the cushion 104 and the occupant 138 as viewed from the left side in the vehicle width direction. The angle of the steering wheel 106 can be suitably changed compared to FIG. 5(a), and in a normal vehicle, the upper part is tilted more toward the front of the vehicle.

The cushion 104 may approach the head 140 of the occupant 138 from below, for example, when the occupant is leaning out of the seat 102 (see FIG. 5). In this case, with the airbag device 100 according to the present embodiment, upward thrust of the cushion 104 is suppressed by the cover doors 154a and 154b to enable the cover doors 154a and 154b (see FIG. 4(b)) to open to the left and right. Therefore, even if the head 140 of the occupant 138 is located above the cover member 110, upward thrust of the head 140 of the occupant 138 caused by the cover doors 154a and 154b can be prevented.

In addition, in the airbag device 100 according to the present embodiment, the upper region 158 part of the cover member 110 also is opened in addition to the frontal region 150. In particular, the upper region 158 opens widely to a position of the vehicle more forward than the module installation surface 109. Thus, when the head 140 of the occupant 138 is positioned above the cover member 110, the cushion 104 can expand toward the front of the vehicle from the head 140 so as to avoid the head 140 of the occupant 138. At this time, the expansion pressure toward the upper side of the cushion 104 is also dispersed toward the front of the vehicle, so thrust upward of the head 140 of the occupant 138 by the cushion 104 is suppressed.

FIG. 7 is a diagram illustrating an occupant 138 in proximity to the steering wheel 106 in FIG. 5(a). FIG. 7(a) illustrates a steering wheel 106 before activation of the airbag device 100 and an occupant 138 in a non-normal seating position corresponding to FIG. 6. FIG. 7(b) is a diagram illustrating the cover member 110 and the head 140 of the occupant 138 of FIG. 7(a) as viewed from above. In the airbag device 100, as a guide for the dimension of the opening of the upper region 158, for example, the upper region 158 preferably opens over a range of 35 mm or more from a chin 141 of the occupant 138 toward the front of the vehicle with the occupant in contact with the steering wheel 106 and movement toward the front of the vehicle stops (S2>35 mm).

Here, in the U.S. Federal Motor Vehicle Safety Standards (FMVSS) standard 208 (FMVSS208) there is a definition related to the front collision test of the vehicle, and the evaluation of a restraining device such as an airbag or a seat belt is also defined therein with a non-normal seating position (out-of-position (hereinafter, abbreviated as OOP)). In the OOP test for airbags, the load experienced by the human body dummy is measured while the human body dummy is in proximity to the airbag.

In the OOP test described above, when the steering wheel 106 (see FIG. 7(a)) of the present embodiment is applicable, the steering wheel 106 is inclined toward the front of the vehicle at an angle of approximately 18° to 27° in the same manner as a normal steering wheel, but there is no rim 114 at the upper part. Therefore, the human body dummy that mimics the occupant 138 moves forward without the head 140 coming into contact with a structure, and the chin 141 and chest 142 are in proximity to the cover member 110. When forward movement of the occupant culminates, opening of the cover member 110 upper region 158 over a range of 35 mm or more toward the front of the vehicle than the chin 141 of the occupant 138 (S2>35 mm), as illustrated in FIG. 7(b), enables the cushion 104 to expand in front of the head 140 as illustrated in FIG. 6, suppressing upward thrust of the cushion 104 on the head 140.

Examples of an occupant 140 [sic] described above include a Hybrid III dummy and a Thor dummy that are human body dummies specified in FMVSS208. Hybrid III dummies are available in a plurality of models that mimic people of different physiques and genders. The Thor dummy is developed as a successor to the Hybrid III dummy, and models only the average body mass male.

Of the human body dummies, the AF05 model of the Hybrid III dummy mimics a female with a small build. In general, when a small adult female operates a vehicle, the seat 102 (see FIG. 1(a)) is often positioned further forward as compared to that of an adult male and is thus in a posture closer to the steering wheel 106. Therefore, the head of a small adult female is more likely to be positioned over the cover member 110 of the steering wheel 106 as compared to an adult male or the like. In addition, small adult females have lower body tolerance and are more prone to injury than adult males.

Thus, with regards to the airbag device 100, with the chest 142 of the AF05 model in contact with the frontal region 150 of the cover member 110, the cover member 110 upper region 158 can be opened over a distance of 35 mm or more towards the front of the vehicle from the chin 141 of the AF05 model. This makes it possible to suitably ensure the safety of a small adult female. Furthermore, by applying the technical concept of this airbag device 100, even for a steering wheel with a different shape or dimensions, the steering wheel cover member is opened over a range of 35 mm or more toward the front of the vehicle from the chin of an occupant whose forward movement has culminated so safety of the occupant can be suitably ensured.

FIG. 4(a) is again referred to. A series illustrating cleaving of the cover member 110 of the present embodiment. For example, in the tear line 156, a portion of the tear line 156 provided in the frontal region 150, in particular, a first thin part 156a is provided in a range along the emblem 152, as a portion having the thinnest plate thickness. Furthermore, of the tear line 156, subsequent to a first thin part 156a, a second thin part 156b is provided over a range branching in 3 directions from a front end 162 of the upper region 158 as thin portions. With this configuration, the cover member 110 will normally tear first from the frontal region 150 starting from the first thin part 156a. Furthermore, if the occupant 138 in a non-normal seating position (FIG. 6(a)) contacts the frontal region 150 but the first cleavage part does not cleave, the pressure thereof is applied to the upper region 158 and causes cleavage with a starting point of the second thin part 156b. That is, when the occupant 138 is in a non-normal seating position, the cover member 110 can be easily cleaved from the upper region 158, and the cushion 104 can expand and deploy in front of the head 140 of the occupant 138 to disperse the expansion pressure and prevent thrusting up of the head 140 of the occupant 138.

With this airbag device 100, the cover doors 154a and 154b (FIG. 4(a)) opening to the left and right and the cover member 110 upper region 158 open widely so upward thrust of the cushion 104 on the head 140 of the occupant 138 (see FIG. 6) can be reduced and dispersed; suppressing backward retroflexion of the head 140 and thus ensuring safety of the occupant 138 upon activation.

Modified Example

Modified examples of each of the above-described components are described below. In each of the diagrams FIG. 8 to FIG. 12, the same sign is attached to the same elements as those already described, and descriptions of the previously mentioned elements are omitted. In the following description, components having the same name as a component already described are assumed to have the same function unless otherwise specified, even if marked with a different sign.

FIG. 8 is a diagram illustrating a first modified example (cover member 200) of the cover member 110 in FIG. 4(a). FIG. 8(a) illustrates the cover member 200 corresponding to FIG. 4(a) before cleavage. The cover member 200 of the present embodiment differs from the cover member 110 in that two cover doors 202a and 202b open up and down. The cover doors 202a and 202b are formed by bisecting the cover member 110 frontal region 150 such that an emblem 164 is included in the upper cover door 202b.

A tear line 204 cuts across the frontal region 150 avoiding the emblem 152, reaches the side parts 168a and 168b of the frontal region 150, and extends along the side parts 168a and 168b to a point close to the side parts 164a and 164b of the upper region 158. From there, the tear line 204 extends close to the front end 162 of the upper surface region 158 along the side parts 164a and 164b of the upper region 158. Herein, the tear line 204 extends along the side parts 164a and 164b of the upper region 158 to a point more forward in the vehicle than the module installation surface 109 of the upper region 158 (see FIG. 8(b)). Furthermore, a front hinge region 206 is formed as an end point of the tear line 204 in a region more forward in the vehicle than the module installation surface 109 of the upper region 158 as a region where the tear line 156 is omitted and that cannot be cleaved, provided as a hinge for the cover door 202a.

FIG. 8(b) illustrates the cover member 200 corresponding to FIG. 6 after cleavage. In this variation, if the head 140 of the occupant 138 is positioned above or below the cover member 200, opening of the cover door 202a more to the front of the vehicle than the module installation surface 109 enables the cover door 202a to prevent the cushion 104 from thrusting up the head 140 of the occupant 138 from below. In addition, widely opening the upper region 158 of the cover member 200 enables dispersing the cushion 104 expansion pressure to a point more toward the front of the vehicle than the head 140 of the occupant 138. As described above, even in this configuration, backward retroflexion of the head 140 can be reduced and dispersed by reducing upward thrust on the head 140 of the occupant 138, and the safety of the occupant 138 can be improved.

FIG. 9 is a diagram illustrating the second to fourth modified examples of the cover member 110 in FIG. 4(a). Each of the cover members differ in structure from that of the cover member 200 of FIG. 4(a) depending on the cover door structure.

FIG. 9(a) illustrates a cover member 220 of the second modified example. With the cover member 220, a total of three cover doors are formed including cover doors 222a and 222b which open to the lower left and right and the cover door 202a which opens upward based on a tear line 224. With the cover member 220 as well, similar to the cover member 200, the cover door 202a opens at a point more to the front of the vehicle than the module installation surface 109 (see FIG. 8(b)), enabling reducing and dispersing the upward thrust force of the cushion 104 on the head 140 of the occupant 138.

FIG. 9(b) illustrates a cover member 240 of the third modified example. The upper part of the cover member 240 is made up of two cover doors 242a and 242b that open to the left and right due to a tear line 244 and the lower part is made up of a cover door 242c that opens downward. With the cover member 240 as well, because the cover doors 242a and 242b include up to near the front end 162 of the upper region 158, similar to the cover member 110 of FIG. 6, upward thrust force of the cushion 104 on the head 140 of the occupant 138 can be reduced and dispersed, suppressing backward retroflexion of the head 140 and enabling improving the safety of the occupant 138 when activated.

FIG. 9(c) illustrates a cover member 260 of the fourth modified example. With the cover member 260, a large part of the frontal region 150 and the upper region 158 are configured to open upward due to the tear line 262 as a single cover door 264. With the cover member 260 as well, similar to the cover member 200, the cover door 264 opens at a point more to the front of the vehicle than the module installation surface 109 (see FIG. 8(b)) enabling reducing and dispersing the upward thrust force of the cushion 104 on the head 140 of the occupant 138.

Figure 10:
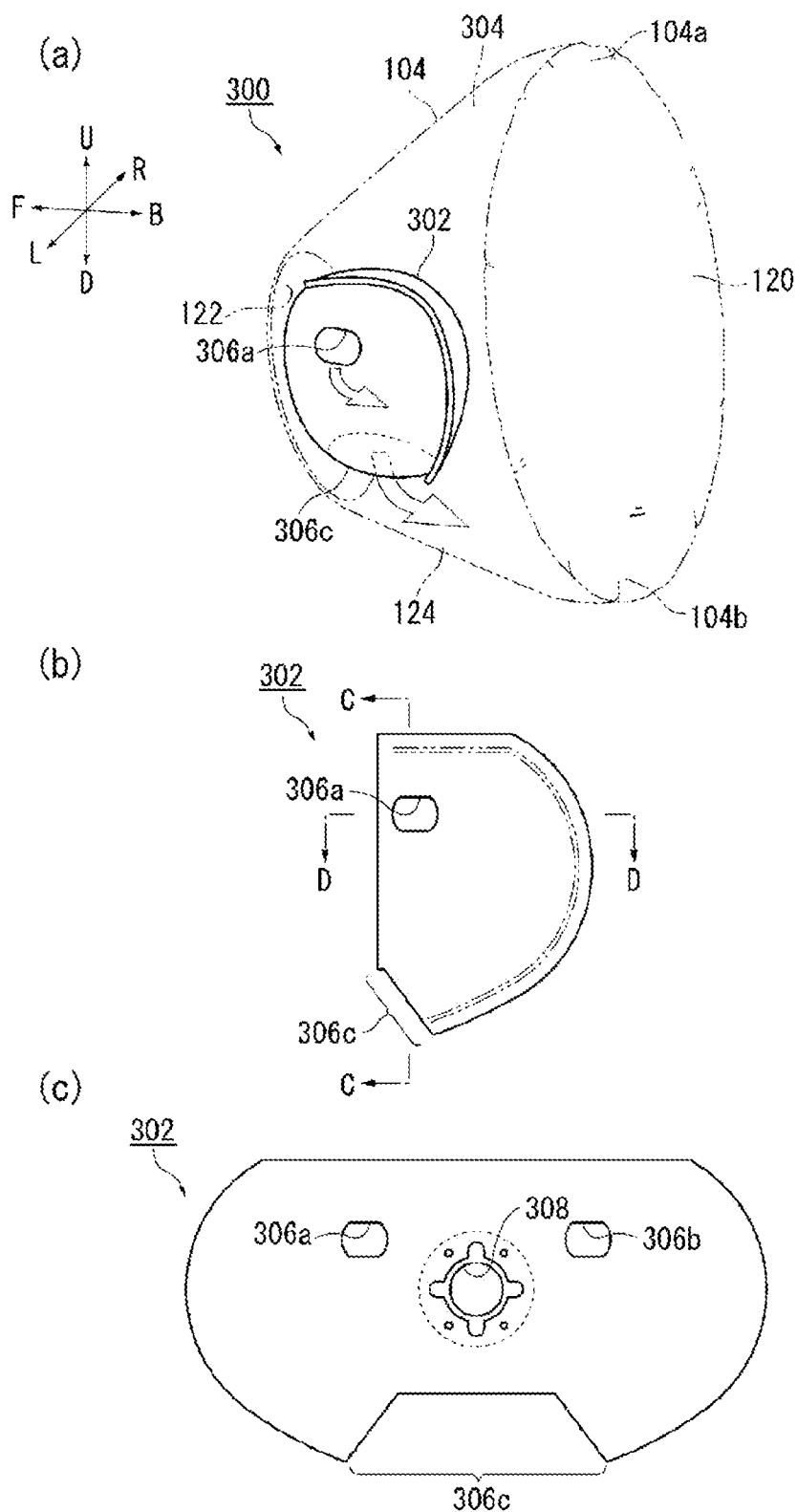
FIG. 10 is a diagram illustrating a first modified example of the airbag module in FIG. 2(a).

FIG. 10 is a diagram illustrating a first modified example of the airbag module 105 in FIG. 2(a) (airbag module 300). FIG. 10(a) illustrates the internal structure of the cushion 104 through each panel of the cushion 104. Regarding the airbag module 300, the cushion 104 is provided with a flow-regulating material 302 as an internal structure.

The flow-regulating material 302 is a member that guides the inflator 112 (see FIG. 2(a)) gas in a particular direction and is encapsulated in a bag shaped main bag 304 that makes up the outer surface of the cushion 104. With the part including the gas outlet port 116 of the inflator 112 inserted into the main bag 304 covered, the flow-regulating material 302 is connected to the rear panel 122. The flow-regulating material 302 includes side outlets 306a and 306b as well as a bottom outlet 306c as locations where the gas from the inflator 112 is discharged.

FIG. 10(b) is a diagram illustrating the flow-regulating material 302 in FIG. 10(a) from the side. The flow-regulating material 302 is formed in a bag shape by sewing, and a bottom outlet 306c is formed in an opening in the lower edge. The bottom outlet 306c is formed with a larger diameter than that of the side outlets 306a and 306b and more gas passes therethrough than the side outlets 306a and 306b. This causes the cushion 104 (see FIG. 10(a)) to expand and deploy preferentially from the lower part 104b. According to this configuration, the cushion 104 allows the lower part 104b to enter between the steering wheel 106 and the abdomen 142 of the occupant 138 at an early stage and to be sandwiched between the steering wheel 106 and the abdomen 142.

FIG. 10(c) illustrates a state where the flow-regulating material 302 of FIG. 10(b) is unstitched and spread out on a plane. The flow-regulating material 302 is provided at the inlet port 308 where a part of the central inflator 112 (see FIG. 2(a)) is inserted and is secured together with the inflator 112 to the module installation surface 109 (see FIG. 3(b)).

Figure 11:
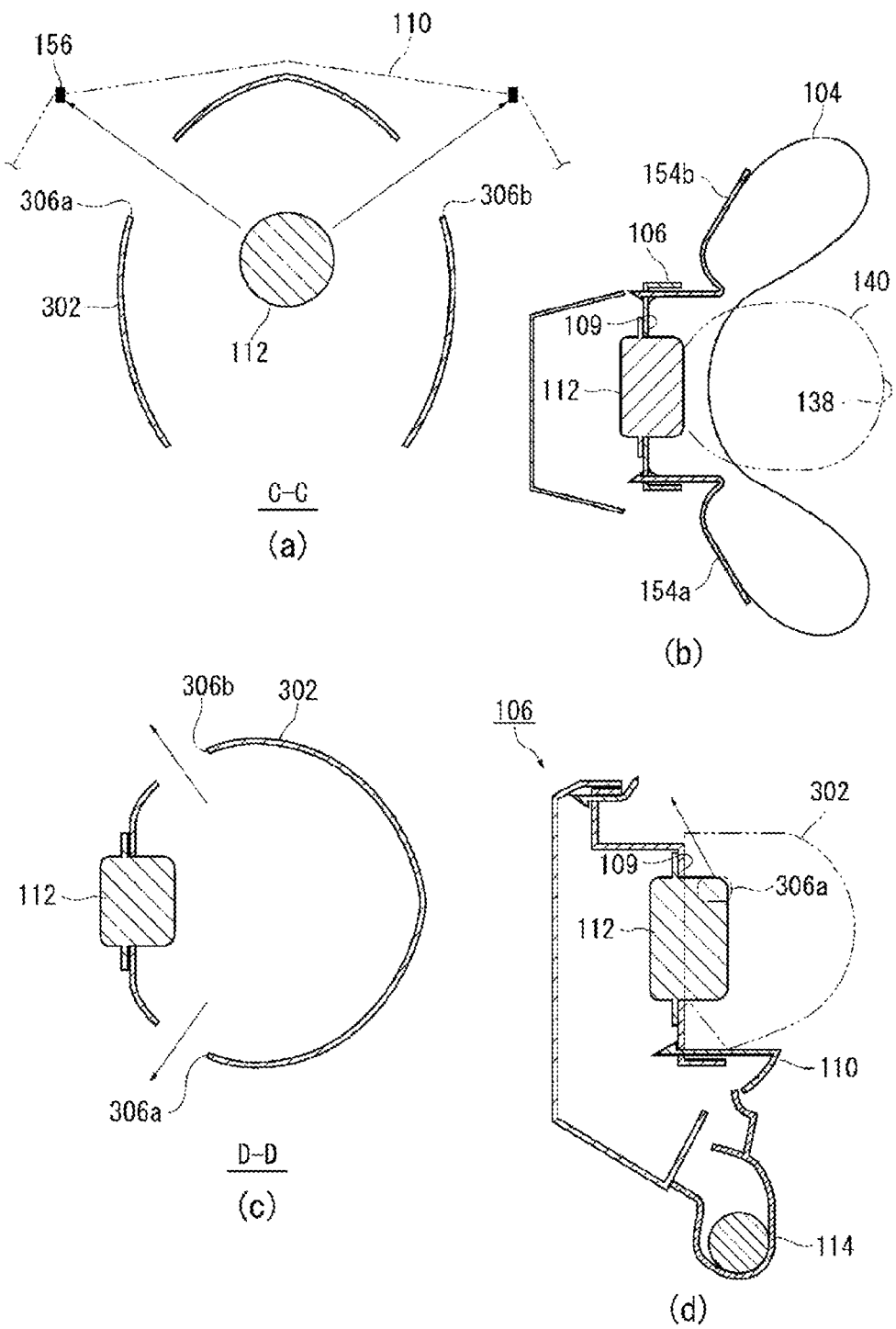
FIG. 11 is a diagram illustrating the flow-regulating material in FIG. 10(b) from various directions.

FIG. 11 is a diagram illustrating the flow-regulating material 302 in FIG. 10(b) from various directions. FIG. 11(a) is a cross-sectional view of the flow-regulating material 302 along C-C in FIG. 10(b). FIG. 11(a) schematically illustrates the upper part of the cover member 110 of FIG. 3(a). The flow-regulating material 302 is made up of side outlets 306a and 306b and when viewing the frontal region 150 directly from the front, gas discharges diagonally upward to the left and right. This configuration enables efficient application of gas so that with respect to the cover member 110, the cover doors 154a and 154b (see FIG. 4(b)) are opened to the left and right. In particular, the side outlets 306a and 306b are formed on a path connecting the inflator 112 and the tear line 156. This configuration enables the tear line 156 of the cover member 110 to cleave efficiently.

FIG. 11(b) illustrates a state in which the cushion 104 is expanded using the flow-regulating material 302 in FIG. 11(a). For the flow-regulating material 302 (see FIG. 11(a)), gas is discharged from the side outlets 306a and 306b but is not discharged directly upwards. Therefore, if the head 140 of a non-normal seating position occupant 138 (see FIG. 6) is positioned above the steering wheel 106, the cushion 104 expands to the left and right while enabling suppressing upward expansion pressure of the cushion 104.

FIG. 11(c) is a cross-sectional view of the flow-regulating material 302 along D-D in FIG. 10(b). The flow-regulating material 302 is set up so that when inflated, gas from the side outlets 306a and 306b flows out at an angle more towards the front of the vehicle than in the vehicle width direction. As illustrated in FIG. 6, this configuration more readily enables dispersion of cushion 104 expansion pressure to the front of the vehicle in the case the occupant 138 is in a non-normal seating position.

FIG. 11(d) illustrates the flow-regulating material 302 and the steering wheel 106 in FIG. 10(b) as viewed from the left side in the vehicle width direction. With the flow-regulating material 302 in an expanded state, the side outlets 306a and 306b preferably discharge gas diagonally at a prescribed angle toward the front of the car, opposite the frontal region 150 (FIG. 5(a)). As illustrated in FIG. 6, this configuration also more readily enables dispersion of the cushion 104 expansion pressure to the front of the vehicle in the case the occupant 138 is in a non-normal seating position.

Thus, the flow-regulating material enables efficient opening of the cover member 110 cover doors 154a and 154b to the left and right. Therefore, the flow-regulating material 302 enables suitably combining the cover member 110 (see FIG. 4(a)) having cover doors that open to the left and right and the cover member 240 (FIG. 9(b)). In addition, in applying the technical concept of the flow-regulating material 302, implementing a flow-regulating material having a discharge port adapted to a tear line and cover door configuration of the cover member 200 (FIG. 8), cover member 220 (FIG. 9(a)), or cover member 260 (FIG. 9(c)) is feasible.

FIG. 12 is a diagram illustrating a second modified example of the airbag module 105 in FIG. 2(a) (airbag module 320). The airbag module 320 is provided with a flow-regulating material 322 as in the internal structure of the cushion 104.

The flow-regulating material 322 is different from the flow-regulating material 302 of FIG. 11(a) in having an overall flat circular shape. Similar to the flow-regulating material 302, the flow-regulating material 322 also has side outlets 306a and 306b and a bottom outlet 306c.

FIG. 12(b) illustrates a rear panel 324 of the flow-regulating material 322 of FIG. 12(a) unfolded on a flat surface. The rear panel 324 is provided with an insertion hole 308 in the center, notches are formed along the side outlets 306a and 306b and along the bottom outlet 306c on the left and right bottom edges and a notch is formed to make the flow-regulating material 322 round.

FIG. 12(c) illustrates a front panel 326 of the flow-regulating material of FIG. 12(a) unfolded on a flat surface. The front panel 326 can be substantially circular and the flow-regulating material (see FIG. 12(a)) can be created by joining the edges to the rear panel 324 (FIG. 12(b)).

Thus, the flow-regulating material 322 also enables efficient opening of the cover member 110 cover doors 154a and 154b to the left and right. Therefore, the flow-regulating material 322 enables suitably combining the cover member 110 (see FIG. 4(a)) having cover doors that open to the left and right and the cover member 240 (FIG. 9(b)).

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used in a driver's seat airbag device for restraining an occupant in an emergency.

DESCRIPTION OF CODES

S1: Distance from the end of the opening of the cover member upper region and the module installation surface;
S2: Dimension from the module installation surface of the cover member upper region;
 100: Airbag device;
 102: Seat;
 104: Cushion;
 104a: Upper portion of cushion;
 104b: Lower portion of cushion;
 105: Airbag module;
 106: Steering wheel;
 108: Hub;
 109: Module installation surface;
 110: Cover member;
 112: Inflator;
 114: Rim;
 116: Gas outlet port;
 118: Stud bolts;
 120: Front panel;
 122: Rear panel;
 124: Side panel;
 126: Vent hole;
 138: Occupant;
 140: Head;
 141: Chin;
 142: Chest;
 144: Abdomen;
 150: Frontal region;
 152: Emblem;
 154a: Left cover door;
 154b: Right cover door;
 156: Tear line;
 156a: First thin part;
 156b: Second thin part;
 158: Upper region;
 160a: Left hinge;
 160b: Right hinge;
 162: Front of upper region;
 164a: Left side of upper region;
 164b: Right side of upper region;
 166: Bottom of frontal region;
 168a: Left side of frontal region;
 168b: Right side of frontal region;
 170a: Left side hinge region;
 170b: Right side hinge region;
 200: Cover member of first modified example;
 202a: Upper cover door;
 202b: Lower cover door;
 204: Tear line;
 206: Front hinge region;
 220: Cover member of second modified example;

222a: Lower left cover door;
222b: Lower right cover door;
240: Cover member of third modified example;
242a: Upper left cover door;
242b: Upper right cover door;
242c: Cover door;
260: Cover member of fourth modified example;
262: Tear line;
264: Cover door;
300: Airbag module of the first modified example;
302: Flow-regulating material;
304: Main bag;
306a: Left side outlet;
306b: Right side outlet;
306c: Bottom outlet;
320: Airbag module of the second modified example;
322: Flow-regulating material;
324: Rear panel of flow-regulating material;
326: Front panel of flow-regulating material;

The invention claimed is:

1. A driver seat airbag device, comprising a steering wheel of a vehicle; and an airbag module including an inflator and an airbag cushion, the airbag module being housed in the steering wheel, wherein
the steering wheel comprises:
a variant rim with upper center part thereof omitted;
a module installation surface for installing the airbag module provided in a center of the rim;
a cover member covering the airbag module installed on the module installation surface;
the cover member comprises:
a frontal region covering an occupant side of the airbag module;
an upper region extending from the upper end of the frontal region toward the front of the vehicle and covering the upper side of the airbag module; and
a tear line provided in a groove shape on the airbag module side of the frontal region and upper region, which cleaves open due to expansion pressure of the airbag cushion, and causes the frontal region and upper region to open as two cover doors;
the tear line extends continuously from at least the center of the frontal region to at least the center of the upper region, wherein a portion of the tear line adjacent the center of the frontal region and an uppermost portion of the tear line on the upper region are thinner than a remainder of the tear line, and
the two cover doors open respectively from the center regions of the frontal region and upper region to the left and right.

2. The driver seat airbag device according to claim 1, wherein
the tear lines branch from near the center of the upper region to the left and right along the front edge of the upper region, extend towards the sides of the upper region, extend at each of the sides of the upper region towards the frontal region respectively, reaching the frontal region, and then respectively extending along the sides of the frontal region,
parts of the tear lines are omitted along the sides of the frontal region respectively that do not cleave, forming a pair of side hinge regions that are hinges for the two cover doors.

3. The driver seat airbag device according to claim 2, wherein the pair of side hinge regions are formed in a manner that when the frontal region is viewed directly from the front, the axes thereof are mutually parallel.

4. The driver seat airbag device according to claim 2, wherein the tear line extends from near the center of the frontal region to the lower end of the frontal region and branches from the lower end toward each side of the frontal region and then extending to the pair of side hinge regions.

5. The driver seat airbag device according to claim 1, wherein in the upper region, the one or more cover doors are formed over 35 mm or more.

6. The driver's seat airbag device according to claim 1, wherein of the upper region, the two cover doors are formed to include a region from the frontal region up to a point more toward the front of the vehicle than the module installation surface.

7. The driver seat airbag device according to claim 1, wherein
the airbag cushion comprises:
a main bag in a bag shape; and
a flow-regulating material encapsulated in this main bag that covers portions including gas outlet ports of the inflator;
the flow-regulating material comprises:
one or a plurality of discharge ports for discharging gas supplied by the inflator, and
the one or a plurality of discharge ports discharge gas diagonally upward to the left and right when viewing the frontal region directly from the front.

8. The driver seat airbag device according to claim 7, wherein the one or more discharge ports are formed on a path connecting the inflator and the tear line.

9. The driver seat airbag device according to claim 7, wherein the one or more discharge ports are inclined toward the side opposite of the frontal region when viewed from the vehicle width direction.

10. A driver seat airbag device, comprising a steering wheel of a vehicle; and an airbag module including an inflator and an airbag cushion, the airbag module being housed in the steering wheel, wherein
the steering wheel comprises:
a variant rim with an upper center part thereof omitted;
a module installation surface for installing the airbag module provided near a center of the rim;
a cover member covering the airbag module installed on the module installation surface; and,
the cover member comprises:
a frontal region covering an occupant side of the airbag module;
an upper region extending from the upper end of the frontal region toward the front of the vehicle and covering the upper side of the airbag module; and
a tear line provided in a groove shape on the airbag module side of the frontal region and upper region, which cleaves open due to expansion pressure of the airbag cushion, and causes the frontal region and upper region to open as two cover doors;
the tear line extends at least across the frontal region to each side of the frontal region, along the sides of the frontal region to points on a bottom edge of the frontal region, and
the two cover doors open left and right.

11. The driver seat airbag device according to claim 10, wherein in the upper region, the one or more cover doors are formed over 35 mm or more.

12. The driver's seat airbag device according to claim 10, wherein of the upper region, the two cover doors are formed to include a region from the frontal region up to a point more toward the front of the vehicle than the module installation surface.

13. The driver seat airbag device according to claim 10, wherein a part of a tear line provided in the frontal region is thinner than a tear line provided in the upper region.

14. The driver seat airbag device according to claim 10, wherein
- the airbag cushion comprises:
- a main bag in a bag shape; and
- a flow-regulating material encapsulated in this main bag that covers portions including gas outlet ports of the inflator;
- the flow-regulating material comprises:
- one or a plurality of discharge ports for discharging gas supplied by the inflator, and
- the one or a plurality of discharge ports discharge gas diagonally upward to the left and right when viewing the frontal region directly from the front.

15. The driver seat airbag device according to claim 14, wherein the one or more discharge ports are formed on a path connecting the inflator and the tear line.

16. The driver seat airbag device according to claim 14, wherein the one or more discharge ports are inclined toward the side opposite of the frontal region when viewed from the vehicle width direction.

\* \* \* \* \*